United States Patent
Hatanaka et al.

(10) Patent No.: US 9,102,847 B2
(45) Date of Patent: Aug. 11, 2015

(54) COMPOSITION FOR FORMING THERMOSET FILM HAVING PHOTO-ALIGNMENT PROPERTIES

(75) Inventors: Tadashi Hatanaka, Funabashi (JP); Mitsumasa Kondo, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/639,773

(22) PCT Filed: Apr. 5, 2011

(86) PCT No.: PCT/JP2011/058632
§ 371 (c)(1),
(2), (4) Date: Oct. 5, 2012

(87) PCT Pub. No.: WO2011/126022
PCT Pub. Date: Oct. 13, 2011

(65) Prior Publication Data
US 2013/0029087 A1    Jan. 31, 2013

(30) Foreign Application Priority Data
Apr. 8, 2010 (JP) ................. 2010-089476

(51) Int. Cl.
| C08F 265/06 | (2006.01) |
| C08G 8/30 | (2006.01) |
| C08G 63/91 | (2006.01) |
| C08B 37/16 | (2006.01) |
| C08L 33/14 | (2006.01) |

(Continued)

(52) U.S. Cl.
CPC .......... *C09D 133/062* (2013.01); *C08L 33/062* (2013.01); *C09D 201/06* (2013.01); *C08K 5/0025* (2013.01); *G02F 1/13363* (2013.01); *G02F 1/133788* (2013.01); *Y10T 428/24* (2015.01)

(58) Field of Classification Search
CPC .................................. G02F 1/133711
See application file for complete search history.

(56) References Cited

U.S. PATENT DOCUMENTS 5,938,972 A * 8/1999 Yasuda et al. ............ 252/299.01
5,958,995 A    9/1999 Narang et al.
(Continued)

FOREIGN PATENT DOCUMENTS

| JP | A-60-38412 | 2/1985 |
| JP | A-7-294726 | 11/1995 |

(Continued)

OTHER PUBLICATIONS

Liu et al., "Enzymatic Synthesis of Poly(4-phenylazophenol)," 2000, Chemistry of Materials, 12, 1577-1584.*
(Continued)

*Primary Examiner* — Mark Ruthkosky
*Assistant Examiner* — Ian Rummel
(74) *Attorney, Agent, or Firm* — Oliff PLC

(57) ABSTRACT

There is provided a material that after the formation of a cured film, exhibits high solvent resistance, liquid crystal-alignment properties, heat resistance, and high transparency. A composition for forming thermoset film having photo-alignment properties and containing a component (A) that is a compound having a photo-aligning group and a hydroxy group, a component (B) that is a polymer having any one of or both of a hydroxy group and a carboxy group, and a component (C) that is a crosslinker.

23 Claims, 1 Drawing Sheet

(51) Int. Cl.
*C08L 61/14* (2006.01)
*C08L 67/02* (2006.01)
*C08F 220/28* (2006.01)
*C08K 5/06* (2006.01)
*C09D 133/06* (2006.01)
*C09D 201/06* (2006.01)
*C08L 33/06* (2006.01)
*G02F 1/13363* (2006.01)
*G02F 1/1337* (2006.01)
*C08K 5/00* (2006.01)

(56) References Cited

U.S. PATENT DOCUMENTS

| | | | |
|---|---|---|---|
| 6,083,575 A * | 7/2000 | Ninomiya et al. | 428/1.1 |
| 6,107,427 A | 8/2000 | Herr et al. | |
| 6,733,958 B2 * | 5/2004 | Fukuda et al. | 430/321 |
| 6,924,339 B2 | 8/2005 | De et al. | |
| 2004/0138394 A1 | 7/2004 | Buchecker et al. | |
| 2005/0089650 A1 | 4/2005 | Tanaka et al. | |
| 2005/0093924 A1 | 5/2005 | Shiba et al. | |
| 2005/0288426 A1 | 12/2005 | Studer et al. | |
| 2007/0093577 A1 | 4/2007 | Kim et al. | |
| 2007/0128430 A1 | 6/2007 | Shirai et al. | |
| 2007/0298191 A1 * | 12/2007 | Yamahara et al. | 428/1.1 |
| 2013/0029087 A1 | 1/2013 | Hatanaka et al. | |

FOREIGN PATENT DOCUMENTS

| | | |
|---|---|---|
| JP | A-7-316242 | 12/1995 |
| JP | A-09-118717 | 5/1997 |
| JP | A-11-72907 | 3/1999 |
| JP | A-2000-63684 | 2/2000 |
| JP | A-2000-103937 | 4/2000 |
| JP | A-2000-119472 | 4/2000 |
| JP | A-2001-235625 | 8/2001 |
| JP | A-2002-287129 | 10/2002 |
| JP | A-2002-317155 | 10/2002 |
| JP | A-2003-222868 | 8/2003 |
| JP | A-2005-037920 | 2/2005 |
| JP | A-2006-511686 | 4/2006 |
| JP | A-2007-94271 | 4/2007 |
| JP | A-2007-121721 | 5/2007 |
| JP | A-2008-217001 | 9/2008 |
| JP | A-2008-231163 | 10/2008 |
| JP | A-2009-138042 | 6/2009 |
| WO | WO 2009/080271 A1 | 7/2009 |

OTHER PUBLICATIONS

Jul. 19, 2011 International Search Report issued in International Application No. PCT/JP2011/058632.
Aug. 2, 2013 Supplementary European Search Report issued in EP 10 80 2255.9.
U.S. Appl. No. 13/381,836, filed Dec. 30, 2011, to Hatanaka et al.
Aug. 24, 2010 International Search Report issued in International Patent Application No. PCT/JP2010/062170.
Apr. 10, 2013 Office Action issued in U.S. Appl. No. 13/381,836.
Oct. 3, 2014 Office Action issued in U.S. Appl. No. 13/381,836.
Oct. 24, 2013 Office Action issued in U.S. Appl. No. 13/381,836.
Apr. 8, 2015 Office Action issued in U.S. Application No. 13/381,836.

* cited by examiner

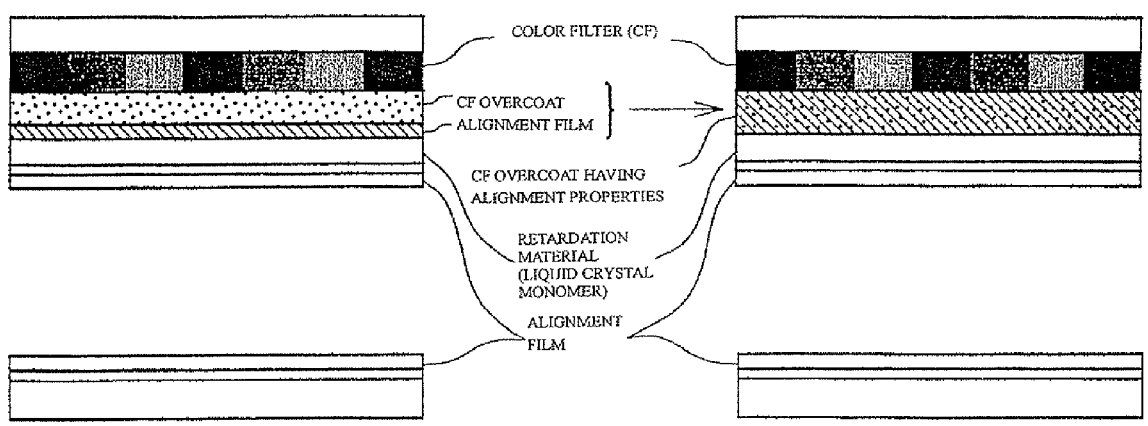

COMPOSITION FOR FORMING THERMOSET FILM HAVING PHOTO-ALIGNMENT PROPERTIES

TECHNICAL FIELD

The present invention relates to a composition for forming thermoset film having photo-alignment properties and a cured film formed from the same. More in detail, the present invention relates to a composition for forming thermoset film having high transparency, liquid crystal alignment capability, high solvent resistance, and heat resistance in a thermoset film formed therefrom, and the application of the thermoset film. The composition for forming thermoset film having photo-alignment properties of the present invention is particularly suitable for a patterned retardation plate used for a 3D display and a color filter overcoating agent serving also as a polymerizable liquid crystal alignment function for forming a built-in retardation layer in a liquid crystal display.

BACKGROUND ART

Generally, in an optical device such as a liquid crystal display element, an organic EL (electroluminescent) element and a solid-state image sensor, a protective film is provided in order to prevent the element surface from being exposed to a solvent or heat during the production process thereof. The protective film is required not only to have high adhesion with a substrate to be protected and high solvent resistance, but also to be excellent in performance such as heat resistance.

In addition, in the case where such a protective film is used as a protective film of a color filter used in a color liquid crystal display device or a solid-state image sensor, the protective film is required to have high transparency in order to maintain the transmittance of light transmitting a color filter.

In recent years, cost reduction and weight reduction by introducing a retardation material into a cell of a liquid crystal display have been studied, and as such a retardation material, there is generally used a material prepared by applying a polymerizable liquid crystal solution to a substrate to align the solution and by photo-curing the resultant coating. For aligning the retardation material, an underlayer film thereof is necessary to be a material having alignment properties after the underlayer film has been subjected to a rubbing process or a polarized UV irradiation. Therefore, the retardation material is formed on a liquid crystal alignment layer formed on an overcoating of a color filter (see FIG. 1A). If a film serving as both the liquid crystal alignment layer and the overcoating of the color filter (see FIG. 1B) can be formed, large advantages such as reduction in cost and reduction in the number of the processes can be obtained, so that a material capable of serving as both the liquid crystal alignment layer and the overcoating is strongly desired.

Generally, for the overcoating of the color filter, an acrylic resin having high transparency is used. For dissolving the acrylic resin, there are widely used a glycol-based solvent such as propylene glycol monomethyl ether and propylene glycol monomethyl ether acetate; an ester solvent such as ethyl lactate and butyl lactate; and a ketone solvent such as cyclohexanone and methyl amyl ketone from the viewpoint of handling properties and coatability. For the acrylic resin, there is taken a technique for enhancing heat resistance and solvent resistance of the acrylic resin by thermo-curing or photo-curing the acrylic resin (Patent Documents 1 and 2). However, although a conventional thereto-curable or photo-curable acrylic resin has appropriate transparency or solvent resistance, satisfactory alignment properties cannot be exhibited even when an overcoating formed from such an acrylic resin is subjected to a rubbing process or a polarized UV irradiation.

For the liquid crystal alignment layer, a material containing a solvent-soluble polyimide or polyamic acid is usually used. It is disclosed that such a material is completely imidated through postbaking, so that solvent resistance is imparted to the material and a rubbing process causes the material to exhibit satisfactory alignment properties (Patent Document 3).

It is disclosed that by irradiating an acrylic resin having in a side chain thereof, a photodimerized moiety such as a cinnamoyl group and a calcone group with polarized UV, satisfactory liquid crystal alignment properties can be exhibited (Patent Document 4).

Furthermore, there is disclosed a liquid crystal aligning agent containing a polymerizable component having a structure crosslinked by heating (Patent Document 5).

RELATED-ART DOCUMENTS

Patent Documents

Patent Document 1: Japanese Patent Application Publication No. 2000-103937 (JP 2000-103937 A)
Patent Document 2: Japanese Patent Application Publication No. 2000-119472 (JP 2000-119472 A)
Patent Document 3: Japanese Patent Application Publication No. 2005-037920 (JP 2005-037920 A)
Patent Document 4: Japanese Patent Application Publication No. 9-118717 (JP 9-118717 A)
Patent Document 5: Japanese Patent Application Publication No. 2003-222868 (JP 2003-222868 A)

SUMMARY OF THE INVENTION

Problem to be Solved by the Invention

However, there is a problem that the liquid crystal alignment layer described in Patent Document 3 has transparency that is too low for use as an overcoating material of a color filter. In addition, although polyimide and polyamic acid are soluble in a solvent such as N-methylpyrrolidone and γ-butyrolactone, they have low solubility in a glycol-based solvent, an ester solvent, and a ketone solvent, so it is difficult to apply the liquid crystal alignment layer to an overcoating production line using such a solvent.

In the technology described in Patent Document 4, when the photodimerization reactivity during the polarized light irradiation is low, intermixing is caused during the application of a polymerizable liquid crystal, which leads to an alignment failure, so that a considerable exposure is necessary.

In the technology described in Patent Document 5, although several percent of an epoxy-based crosslinker is added, which is for enhancing tilt stability of the liquid crystal, there is no moiety reacted with an epoxy group in the polymer. Therefore, also in the case of using a polymerizable liquid crystal, when the photodimerization reactivity during the polarized light irradiation is low, intermixing is caused during the application of a polymerizable liquid crystal, which leads to an alignment failure, so that a considerable exposure is necessary.

In the technology of imparting liquid crystal alignment properties by irradiating with light, only by irradiating the liquid crystal alignment layer with polarized UV in an usual exposure dosage (for example, 100 mJ/cm$^2$), the photodimerization reactivity is low and the liquid crystal alignment layer is not satisfactorily crosslinked, so that solvent resistance and heat resistance of the liquid crystal alignment layer becomes low. Therefore, when a polymerizable liquid crystal is applied onto the liquid crystal alignment layer for forming a retardation material layer thereon, the liquid crystal alignment layer is dissolved in the polymerizable liquid crystal, so that the retardation material layer cannot exhibit satisfactory alignment properties. When the exposure dosage is increased to 1 J/cm$^2$ or more in order to enhance the photodimerization reactivity, alignment properties of the polymerizable liquid crystal are enhanced; however, the exposure time becomes extremely long, and such a method cannot be practical. Furthermore, a material used in a conventional liquid crystal alignment layer is a material having only a photodimerized moiety as a crosslinked moiety, so that the number of crosslinked moieties is small as a whole and the produced liquid crystal alignment layer does not have satisfactory heat resistance. Therefore, it is also feared that the liquid crystal alignment layer is largely contracted during the production process of a display element performed at 200° C. or more after the formation of the retardation material.

As one method of the 3D display, a circularly polarized light glasses method has been put into practical use. In this method, a patterned retardation plate is laminated on a panel of a liquid crystal display and this patterned retardation plate is generally produced by optically patterning a retardation material composed of a polymerizable liquid crystal. The optical patterning of the polymerizable liquid crystal can be performed by irradiating a photo-alignment film with polarized light having polarization directions varied alternately. In the production process of the patterned retardation plate, this polarized light exposure process takes much time, so that in order to enhance the productivity, it is necessary to enhance the alignment sensitivity of the photo-alignment film. In addition, in recent years, there is studied the reduction in cost by forming the patterned retardation plate on not a conventional glass substrate, but an inexpensive film such as a TAC (triacetylcellulose, hereinafter, abbreviated as TAC) film to produce the patterned retardation plate by roll-to-roll. However, a conventional photo-alignment film has low solubility and a TAC film has no resistance against the used solvent, so that hitherto, there is no photo-alignment material capable of being directly applied onto the TAC film.

The present invention has been invented under the circumstances described above and the problem to be solved by the present invention is to provide a material that exhibits high solvent resistance after the formation of a cured film, excellent photo-alignment capability relative to a polymerizable liquid crystal, satisfactory heat resistance, and high transparency and moreover, that can be dissolved in a glycol-based solvent, a ketone solvent, or a lactic acid ester solvent that are applicable to the production of an overcoating of a color filter, during the formation of the cured film.

Means for Solving the Problem

As a result of assiduous research intended to overcome these disadvantages, the inventors of the present invention have achieved the present invention.

That is, the present invention, according to a first aspect, relates to a composition for forming thermoset film having photo-alignment properties and containing a component (A) that is a compound having a photo-aligning group and a hydroxy group, a component (B) that is a polymer having any one of or both of a hydroxy group and a carboxy group, and a component (C) that is a crosslinker.

The present invention, according to a second aspect, relates to the composition for forming thermoset film having photo-alignment properties according to the first aspect in which the photo-aligning group of the component (A) is a functional group having a structure to be photodimerized or photoisomerized.

The present invention, according to a third aspect, relates to the composition for forming thermoset film having photo-alignment properties according to the first aspect or the second aspect in which the photo-aligning group of the component (A) is a cinnamoyl group.

The present invention, according to a fourth aspect, relates to the composition for forming thermoset film having photo-alignment properties according to the first aspect or the second aspect in which the photo-aligning group of the component (A) is a group having an azobenzene structure.

The present invention, according to a fifth aspect, relates to the composition for forming thermoset film having photo-alignment properties according to any one of the first aspect to the fourth aspect in which the component (B) is an acrylic polymer having at least one of a $C_{2-5}$ alkyl ester group and a $C_{2-5}$ hydroxyalkyl ester group and at least one of a carboxy group and a phenolic hydroxy group.

The present invention, according to a sixth aspect, relates to the composition for forming thermoset film having photo-alignment properties according to any one of the first aspect to the fourth aspect in which the component (B) is an acrylic copolymer obtained by a polymerization reaction of monomers containing at least one of a monomer having a $C_{2-5}$ alkyl ester group and a monomer having a $C_{2-5}$ hydroxyalkyl ester group and at least one of a monomer having a carboxy group and a monomer having a phenolic hydroxy group.

The present invention, according to a seventh aspect, relates to the composition for forming thermoset film having photo-alignment properties according to any one of the first aspect to the fourth aspect in which the component (B) is a phenol novolac resin.

The present invention, according to an eighth aspect, relates to the composition for forming thermoset film having photo-alignment properties according to any one of the first aspect to the fourth aspect in which the component (B) is cyclodextrin or a derivative thereof.

The present invention, according to a ninth aspect, relates to the composition for forming thermoset film having photo-alignment properties according to any one of the first aspect to the fourth aspect in which the component (B) is a polyester resin having a carboxy group.

The present invention, according to a tenth aspect, relates to the composition for forming thermoset film having photo-alignment properties according to any one of the first aspect to the ninth aspect in which the crosslinker as the component (C) is a crosslinker having a methylol group or an alkoxymethylol group.

The present invention, according to an eleventh aspect, relates to the composition for forming thermoset film having photo-alignment properties according to any one of the first aspect to the tenth aspect, further containing as a component (D), an acid or a thermo-acid generator.

The present invention, according to a twelfth aspect, relates to the composition for forming thermoset film having photo-alignment properties according to any one of the first aspect to the eleventh aspect, further containing as a component (E), a sensitizer.

The present invention, according to a thirteenth aspect, relates to the composition for forming thermoset film having photo-alignment properties according to any one of the first aspect to the twelfth aspect in which the ratio between the component (A) and the component (B) is 5:95 to 60:40 in a mass ratio.

The present invention, according to a fourteenth aspect, relates to the composition for forming thermoset film having photo-alignment properties according to any one of the first aspect to the thirteenth aspect, in which 10 to 100 parts by mass of the component (C), based on 100 parts by mass of the total amount of the component (A) and the component (B), is contained.

The present invention, according to a fifteenth aspect, relates to the composition for forming thermoset film having photo-alignment properties according to any one of the eleventh aspect to the fourteenth aspect, in which 0.01 to 10 parts by mass of the component (D), based on 100 parts by mass of the total amount of the component (A) and the component (B), is contained.

The present invention, according to a sixteenth aspect, relates to the composition for forming thermoset film having photo-alignment properties according to any one of the twelfth aspect to the fifteenth aspect, in which 0.1 to 20 parts by mass of the component (E), based on 100 parts by mass of the total amount of the component (A) and the component (B), is contained.

The present invention, according to a seventeenth aspect, relates to the composition for forming thermoset film having photo-alignment properties according to any one of the first aspect to the sixteenth aspect, characterized by further containing a glycol-based solvent or a glycol ester-based solvent as a solvent for dissolving the component (A), the component (B), and the component (C).

The present invention, according to an eighteenth aspect, relates to a liquid crystal alignment layer formed from the composition for forming thermoset film having photo-alignment properties according to any one of the first aspect to the seventeenth aspect.

The present invention, according to a nineteenth aspect, relates to an optical device including a retardation layer obtained using the composition for forming thermoset film having photo-alignment properties according to any one of the first aspect to the seventeenth aspect.

The present invention, according to a twentieth aspect, relates to a patterned retardation plate formed from the composition for forming thermoset film having photo-alignment properties according to any one of the first aspect to the seventeenth aspect.

Effects of the Invention

The composition for forming thermoset film having photo-alignment properties of the present invention can form a cured film having, besides high transparency, high solvent resistance, and high heat resistance, liquid crystal alignment capability by light irradiation (photo-alignment properties), so that the composition can be used as a material for forming a photo-aligning liquid crystal alignment film and a photo-aligning overcoating. Particularly, by the composition of the present invention, a "polymerizable liquid crystal alignment layer" providing the characteristics of both of a layer for aligning a polymerizable liquid crystal for forming a retardation material in a cell of a display and an overcoating layer of a color filter can be formed at once, so that a cost reduction by the simplification of the production process and the reduction of the number of processes can be achieved.

Furthermore, the composition for forming thermoset film having photo-alignment properties of the present invention is soluble in a glycol-based solvent, a ketone solvent, and a lactic acid ester solvent, so that the composition can be suitably used in a production line of an overcoating of a color filter using mainly such solvents.

BRIEF DESCRIPTION OF THE DRAWINGS

FIG. 1 is a model diagram showing the contrast of a liquid crystal cell (b) in which a color filter (CF) overcoating having alignment properties is formed using the composition for forming thermoset film having photo-alignment properties of the present invention with a liquid crystal cell (a) in which a liquid crystal alignment film is formed by a conventional technology.

MODES FOR CARRYING OUT THE INVENTION

The present invention is characterized by enhanced liquid crystal alignment capability due to light irradiation (photo-alignment properties), besides the transparency, solvent resistance, and heat resistance mentioned above. That is, the present invention relates to a composition for forming thermoset film having photo-alignment properties and containing a compound having a photo-aligning group and a hydroxy group that is a component (A), a polymer having any one of or both of a hydroxy group and a carboxy group that is a component (B), and a crosslinker that is a component (C). Furthermore, the present invention relates to a composition for forming thermoset film having photo-alignment properties capable of containing besides the component (A), the component (B), and the component (C), an acid or a thermo-acid generator as a component (D) and a sensitizer as a component (E). Here, the thermoset film having photo-alignment properties refers to a film cured by heating, in which optical anisotropy is induced by irradiation with linearly polarized light.

Details of the components will be described hereinafter.

<Component (A)>

The component (A) is a compound having a photo-aligning group and a hydroxy group.

In the present invention, the photo-aligning group refers to a functional group of a structure moiety to be photodimerized or photoisomerized.

The structure moiety to be photodimerized refers to a structure moiety forming a dimer by being irradiated with light and specific examples thereof include a cinnamoyl group, a calcone group, a coumarin group, and an anthracene group. Among them, preferred is a cinnamoyl group having high transparency in a visible light region and photodimerization reactivity. In addition, the structure moiety to be photoisomerized refers to a structure moiety converted into a cis form or a trans form by being irradiated with light and specific examples thereof include a moiety containing an azobenzene structure and a moiety containing a stilbene structure. Among them, in terms of high reactivity, the azobenzene structure is preferred. The compound having a photo-aligning group and a hydroxy group is a compound of formulae:

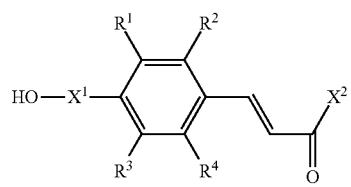

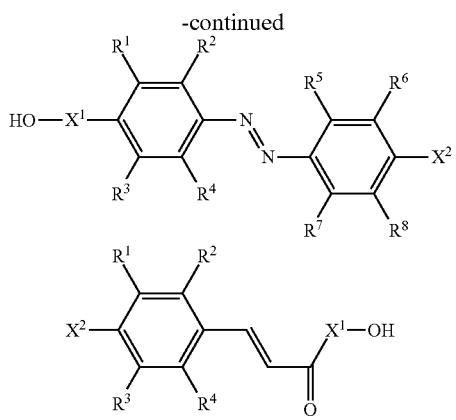

(In the formulae, $X^1$ is a single bond or is a $C_{1-18}$ alkylene group, a phenylene group, a biphenylene group, or a cyclohexylene group bonded through a covalent bond, an ether bond, an ester bond, an amide bond, an amino bond, or a urea bond. At this time, the alkylene group, the phenylene group, and the biphenylene group are optionally substituted with one or more substituent(s) the same as or different from each other that is(are) selected from a halogen atom and a cyano group.

$X^2$ is a hydrogen atom, a cyano group, a nitro group, a $C_{1-18}$ alkyl group, a phenyl group, a biphenyl group, or a cyclohexyl group. At this time, the $C_{1-18}$ alkyl group, the phenyl group, the biphenyl group, or the cyclohexyl group is optionally bonded through a covalent bond, an ether bond, an ester bond, an amide bond, an amino bond, or a urea bond and the phenyl group and the biphenyl group are optionally substituted with any one of a halogen atom and a cyano group.

$R^1$, $R^2$, $R^3$, $R^4$, $R^5$, $R^6$, $R^7$, and $R^8$ are independently a hydrogen atom, a $C_{1-4}$ alkyl group, a $C_{1-4}$ alkoxy group, a halogen atom, a trifluoromethyl group, or a cyano group.)

Specific examples of the compound having a photo-aligning group and a hydroxy group include 4-(8-hydroxyoctyloxy)cinnamic acid methyl ester, 4-(6-hydroxyhexyloxy)cinnamic acid methyl ester, 4-(4-hydroxybutyloxy)cinnamic acid methyl ester, 4-(3-hydroxypropyloxy)cinnamic acid methyl ester, 4-(2-hydroxyethyloxy)cinnamic acid methyl ester, 4-hydroxymethyloxycinnamic acid methyl ester, 4-hydroxycinnamic acid methyl ester, 4-(8-hydroxyoctyloxy)cinnamic acid ethyl ester, 4-(6-hydroxyhexyloxy)cinnamic acid ethyl ester, 4-(4-hydroxybutyloxy)cinnamic acid ethyl ester, 4-(3-hydroxypropyloxy)cinnamic acid ethyl ester, 4-(2-hydroxyethyloxy)cinnamic acid ethyl ester, 4-hydroxymethyloxycinnamic acid ethyl ester, 4-hydroxycinnamic acid ethyl ester, 4-(8-hydroxyoctyloxy)cinnamic acid phenyl ester, 4-(6-hydroxyhexyloxy)cinnamic acid phenyl ester, 4-(4-hydroxybutyloxy)cinnamic acid phenyl ester, 4-(3-hydroxypropyloxy)cinnamic acid phenyl ester, 4-(2-hydroxyethyloxy)cinnamic acid phenyl ester, 4-hydroxymethyloxycinnamic acid phenyl ester, 4-hydroxycinnamic acid phenyl ester, 4-(8-hydroxyoctyloxy)cinnamic acid biphenyl ester, 4-(6-hydroxyhexyloxy)cinnamic acid biphenyl ester, 4-(4-hydroxybutyloxy)cinnamic acid biphenyl ester, 4-(3-hydroxypropyloxy)cinnamic acid biphenyl ester, 4-(2-hydroxyethyloxy)cinnamic acid biphenyl ester, 4-hydroxymethyloxycinnamic acid biphenyl ester, 4-hydroxycinnamic acid biphenyl ester, cinnamic acid 8-hydroxyoctyl ester, cinnamic acid 6-hydroxyhexyl ester, cinnamic acid 4-hydroxybutyl ester, cinnamic acid 3-hydroxypropyl ester, cinnamic acid 2-hydroxyethyl ester, cinnamic acid hydroxymethyl ester, 4-(8-hydroxyoctyloxy)azobenzene, 4-(6-hydroxyhexyloxy)azobenzene, 4-(4-hydroxybutyloxy)azobenzene, 4-(3-hydroxypropyloxy)azobenzene, 4-(2-hydroxyethyloxy)azobenzene, 4-hydroxymethyloxyazobenzene, 4-hydroxyazobenzene, 4-(8-hydroxyoctyloxy)calcone, 4-(6-hydroxyhexyloxy)calcone, 4-(4-hydroxybutyloxy)calcone, 4-(3-hydroxypropyloxy)calcone, 4-(2-hydroxyethyloxy)calcone, 4-hydroxymethyloxycalcone, 4-hydroxycalcone, 4'-(8-hydroxyoctyloxy)calcone, 4'-(6-hydroxyhexyloxy)calcone, 4'-(4-hydroxybutyloxy)calcone, 4'-(3-hydroxypropyloxy)calcone, 4'-(2-hydroxyethyloxy)calcone, 4'-hydroxymethyloxycalcone, 4'-hydroxycalcone, 7-(8-hydroxyoctyloxy)coumarin, 7-(6-hydroxyhexyloxy)coumarin, 7-(4-hydroxybutyloxy)coumarin, 7-(3-hydroxypropyloxy)coumarin, 7-(2-hydroxyethyloxy)coumarin, 7-hydroxymethyloxycoumarin, 7-hydroxycoumarin, 6-hydroxyoctyloxycoumarin, 6-hydroxyhexyloxycoumarin, 6-(4-hydroxybutyloxy)coumarin, 6-(3-hydroxypropyloxy)coumarin, 6-(2-hydroxyethyloxy)coumarin, 6-hydroxymethyloxycoumarin, and 6-hydroxycoumarin, to which the specific examples are not limited.

In the present invention, the compound as the component (A) may be a mixture of compounds having a plurality of types of photo-aligning groups and a hydroxy group.

<Component (B)>

The component (B) is a polymer (hereinafter, called also "specific polymer") having any one of or both of a hydroxy group and a carboxy group.

In the present invention, the specific polymer may be a polymer having any one of or both of a hydroxy group and a carboxy group, and examples thereof include acrylic polymers, phenol novolac resins, cyclodextrins, celluloses, polyamic acid, polyimide, polyvinyl alcohol, and polyester. Among them, as the acrylic polymer, there can be applied a polymer obtained by polymerizing a monomer having an unsaturated double bond such as an acrylic acid ester, a methacrylic acid ester, and styrene.

The specific polymer as the component (B) is preferably, for example, a phenol novolac resin, cyclodextrins, celluloses, polyester, and an acrylic polymer having at least one of a $C_{2-5}$ alkyl ester group and a $C_{2-5}$ hydroxyalkyl ester group and at least one of a carboxy group and a phenolic hydroxy group.

The acrylic polymer having at least one of a $C_{2-5}$ alkyl ester group and a $C_{2-5}$ hydroxyalkyl ester group and at least one of a carboxy group and a phenolic hydroxy group, which is one type of the specific polymer as the component (B), may be an acrylic polymer having such a structure and the skeleton of the backbone, the type of the side chain, and the like of the polymer constituting the acrylic polymer are not particularly limited.

A preferred structure unit as the structure unit having at least one of a $C_{2-5}$ alkyl ester group and a $C_{2-5}$ hydroxyalkyl ester group is a structure unit of Formula [B1] below.

A preferred structure unit as the structure unit having at least one of a carboxy group and a phenolic hydroxy group is a structure unit of Formula [B2] below.

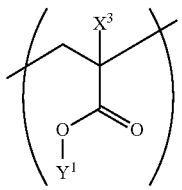

[B1]

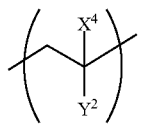

[B2]

(In Formulae [B1] and [B2], $X^3$ and $X^4$ are independently a hydrogen atom or a methyl group; $Y^1$ is a $C_{1-4}$ alkyl group or a $C_{1-3}$ hydroxyalkyl group; and $Y^2$ is a carboxy group or a phenolic hydroxy group).

The polymer as the component (B) has a weight average molecular weight of preferably 3,000 to 200,000, more preferably 4,000 to 150,000, further more preferably 5,000 to 100,000. When the weight average molecular weight is more than 200,000 to be excessively large, the solubility of the polymer relative to a solvent decreases, so that the handling property thereof may be lowered. When the weight average molecular weight is less than 3,000 to be excessively small, a lack of curing is caused during thermo-curing of the polymer, so that solvent resistance and heat resistance of the polymer may decrease. Here, the weight average molecular weight is a value obtained by gel permeation chromatography (GPC) using polystyrene as the standard sample.

As the synthesis method of an acrylic polymer that is one type of the polymer as the component (B), a method for copolymerizing a monomer (hereinafter, called "b1 monomer") having at least one of a $C_{2-5}$ alkyl ester group and a $C_{2-5}$ hydroxyalkyl ester group with a monomer (hereinafter, called "b2 monomer") having at least one of a carboxy group and a phenolic hydroxy group, is simple.

Examples of the monomer having a $C_{2-5}$ alkyl ester group include methyl methacrylate, methyl acrylate, ethyl methacrylate, ethyl acrylate, propyl methacrylate, propyl acrylate, isopropyl methacrylate, isopropyl acrylate, butyl methacrylate, butyl acrylate, isobutyl methacrylate, isobutyl acrylate, tort-butyl methacrylate, and tert-butyl acrylate.

Examples of the monomer having a $C_{2-5}$ hydroxyalkyl ester group include 2-hydroxyethyl methacrylate, 2-hydroxyethyl acrylate, 2-hydroxypropyl methacrylate, and 2-hydroxypropyl acrylate.

Examples of the monomer having a carboxy group include acrylic acid, methacrylic acid, and vinylbenzoic acid.

Examples of the monomer having a phenolic hydroxy group include p-hydroxystyrene, m-hydroxystyrene, and o-hydroxystyrene.

Examples of the monomer having a hydroxy group that can be used when obtaining the specific polymer as the component (B) include besides the above-described monomers having a hydroxy group, vinyl alcohol, allyl alcohol, ethylvinyl carbitol, 1,1-dimethylally alcohol, vinyl carbitol, and vinyl glycol.

In the present invention, when the specific polymer as the component (B) is obtained, a monomer having neither a hydroxy group nor a carboxy group may be used in combination so long as not impairing the effect of the present invention.

Examples of such a monomer include an acrylic acid ester compound, a methacrylic acid ester compound, a maleimide compound, an acrylamide compound, acrylonitrile, maleic anhydride, a styrene compound, and a vinyl compound.

The used amounts of the b1 monomer and the b2 monomer used for obtaining the acrylic polymer as the polymer of the component (B) are preferably 2 to 95% by mole and 5 to 98% by mole, respectively, based on the total mole of all monomers used for obtaining the acrylic polymer as the polymer of the component (B).

When a monomer having only a carboxy group is used as the b2 monomer, it is preferred that the amount of the b1 monomer be 60 to 95% by mole and the amount of the b2 monomer be 5 to 40% by mole, based on the total mole of all monomers used for obtaining the acrylic polymer as the polymer of the component (B).

When a monomer having only a phenolic hydroxy group is used as the b2 monomer, it is preferred that the amount of the b1 monomer be 2 to 80% by mole and the amount of the b2 monomer be 20 to 98% by mole. When the amount of the b2 monomer is excessively small, the liquid crystal alignment properties of the composition are prone to be unsatisfactory and when the amount of the b2 monomer is excessively large, the compatibility of the component (B) with the compound having a photo-aligning group and a hydroxy group as the component (A) are prone to be lowered.

Although the method for obtaining the acrylic polymer as the polymer of the component (B) is not particularly limited, the acrylic polymer can be obtained, for example, by subjecting the b1 monomer, the b2 monomer, and if desired, a monomer other than the b1 monomer and the b2 monomer, a polymerization initiator, and the like to a polymerization reaction in a solvent in which they coexist at a temperature of 50° C. to 110° C. The solvent used at this time is not particularly limited so long as the solvent can dissolve the b1 monomer, the b2 monomer, a monomer other than the b1 monomer and the b2 monomer used if desired, a polymerization initiator, and the like. Specific examples of the solvent are described in <Solvent> described below.

The acrylic polymer as the polymer of the component (B) obtained by the above-described method is usually in a solution state in which the acrylic polymer is dissolved in a solvent.

By a method including: charging a solution of the acrylic polymer as the polymer of the component (B) obtained by the above-described method into diethyl ether, water, or the like with stirring to reprecipitate; filtering and washing the resultant precipitate; and drying the precipitate at normal temperature or by heating under normal pressure or reduced pressure, a powder of the acrylic polymer as the polymer of the component (B) can be prepared. By the above-described operation, the polymerization initiator and an unreacted monomer that coexist with the acrylic polymer as the polymer of the component (B) can be removed and as the result thereof, a powder of the purified acrylic polymer as the component (B) can be obtained. When the purification thereof cannot be satisfactorily performed by one operation, the obtained powder may be redissolved in a solvent, followed by repeating the above-described operation.

In the present invention, the acrylic polymer that is one type of the polymer as the component (B) may be used in either a powder state or a solution state in which the purified powder thereof is redissolved in the below-described solvent.

In the present invention, the polymer as the component (B) may also be a mixture of a plurality of types of polymers having any one of or both of a hydroxy group and a carboxy group.

<Component (C)>

The component (C) of the present invention is a crosslinker bonded with a hydroxy group of the compound as the component (A) and a hydroxy group and/or carboxy group moiety contained in the component (B). Examples of the crosslinker include an epoxy compound, a methylol compound, and an isocyanate compound, and preferred is a methylol compound.

Specific examples of the methylol compound include compounds such as alkoxymethylated glycoluril, alkoxymethylated benzoguanamine, and alkoxymethylated melamine.

Specific examples of alkoxymethylated glycoluril include 1,3,4,6-tetrakis(methoxymethyl)glycoluril, 1,3,4,6-tetrakis(butoxymethyl)glycoluril, 1,3,4,6-tetrakis(hydroxymethyl)glycoluril, 1,3-bis(hydroxymethyl)urea, 1,1,3,3-tetrakis(butoxymethyl)urea, 1,1,3,3-tetrakis(methoxymethyl)urea, 1,3-bis(hydroxymethyl)-4,5-dihydroxy-2-imidazolinone, and 1,3-bis(methoxymethyl)-4,5-dimethoxy-2-imidazolinone. Examples of the commercially available product thereof include: compounds such as a glycoluril compound (manufactured by Nihon Cytec Industries, Inc. (former: Mitsui Cytec Ltd.); trade name: Cymel [registered trade mark] 1170, Powderlink [registered trade mark] 1174); a methylated urea resin (manufactured by Nihon Cytec Industries, Inc.; trade name: UFR [registered trade mark] 65); a butylated urea resin (manufactured by Nihon Cytec Industries, Inc.; trade name: UFR [registered trade mark] 300, U-VAN10S60, U-VAN10R, U-VAN11HV); and a urea/formaldehyde-based resin (manufactured by DIC Corporation (former: Dainihon Ink & Chemicals Inc.); trade name: Beckamine [registered trade mark] J-300S, P-955, N; highly condensed-type).

Specific examples of alkoxymethylated benzoguanamine include tetramethoxymethyl benzoguanamine. Examples of the commercially available product thereof include a product (manufactured by Nihon Cytec Industries, Inc. (former: Mitsui Cytec Ltd.); trade name: Cymel [registered trade mark] 1123) and a product (manufactured by Sanwa Chemical Co., Ltd.; trade name: NIKALAC [registered trade mark] BX-4000, BX-37, BL-60, BX-55H).

Specific examples of alkoxymethylated melamine include hexamethoxymethyl melamine. Examples of the commercially available product thereof include a methoxymethyl-type melamine compound (manufactured by Nihon Cytec Industries, Inc. (former: Mitsui Cytec Ltd.); trade name: Cymel [registered trade mark] 300, 301, 303, 350), a butoxymethyl-type melamine compound (manufactured by Nihon Cytec Industries, Inc.; trade name: Mycoat [registered trade mark] 506, 508), a methoxymethyl-type melamine compound (manufactured by Sanwa Chemical Co., Ltd.; trade name: NIKALAC [registered trade mark] MW-30, MW-22, MW-11, MS-001, MX-002, MX-730, MX-750, MX-035), and a butoxymethyl-type melamine compound (manufactured by Sanwa Chemical Co., Ltd.; trade name: NIKALAC [registered trade mark] MX-45, MX-410, MX-302).

The component (C) may also be a compound obtained by condensing a melamine compound, a urea compound, a glycoluril compound, or a benzoguanamine compound in which a hydrogen atom of an amino group is substituted with a methylol group or an alkoxymethyl group. Examples thereof include a macromolecular compound produced from a melamine compound or a benzoguanamine compound described in U.S. Pat. No. 6,323,310. Examples of the commercially available product of the melamine compound include a product (manufactured by Nihon Cytec Industries, Inc. (former: Mitsui Cytec Ltd.); trade name: Cymel [registered trade mark] 303), and examples of the commercially available product of the benzoguanamine compound include a product (manufactured by Nihon Cytec Industries, Inc. (former: Mitsui Cytec Ltd.); trade name: Cymel [registered trade mark] 1123).

Furthermore, as the component (C), there can also be used a polymer produced using an acrylamide compound or a methacrylamide compound that are substituted with a hydroxymethyl group or an alkoxymethyl group such as N-hydroxymethylacrylamide, N-methoxymethylmethacrylamide, N-ethoxymethylacrylamide, and N-butoxymethylacrylamide.

Examples of such a polymer include a poly(N-butoxymethylacrylamide), a copolymer of N-butoxymethylacrylamide with styrene, a copolymer of N-hydroxymethylmethacrylamide with methyl methacrylate, a copolymer of N-ethoxymethylmethacrylamide with benzyl methacrylate, and a copolymer of N-butoxymethylacrylamide, benzyl methacrylate, and 2-hydroxypropyl methacrylate. The weight average molecular weight of such a polymer is 1,000 to 500,000, preferably 2,000 to 200,000, more preferably 3,000 to 150,000, further preferably 3,000 to 50,000. The weight average molecular weight is a value obtained by gel permeation chromatography (GPC) using polystyrene as the standard sample.

These crosslinkers may be used individually or in combination of two or more types thereof.

The content of the crosslinker as the component (C) in the composition for forming thermoset film having photo-alignment properties of the present invention is preferably 10 to 100 parts by mass, more preferably 15 to 80 parts by mass, based on 100 parts by mass of the total amount of the compound as the component (A) and the polymer as the component (B). When the content of the crosslinker is excessively small, solvent resistance and heat resistance of the cured film obtained from the composition for forming thermoset film having photo-alignment properties decrease and the sensitivity thereof during photo-alignment is lowered. When the content of the crosslinker is excessively large, photo-alignment properties and preservation stability of the cured film may be lowered.

<Component (D)>

In the present invention, the composition for forming thermoset film may contain an acid or a thermo-acid generator as the component (D). The component (D) is effective for accelerating a thermo-curing reaction of the composition for forming thermoset film having photo-alignment properties of the present invention.

The component (D) is not particularly limited so long as the component (D) is a sulfonic acid group-containing compound, hydrochloric acid or a salt thereof, or a compound generating an acid by being thermally decomposed during prebaking or postbaking, that is, a compound generating an acid by being thermally decomposed at a temperature of 80° C. to 250° C. Examples of such a compound include: hydrochloric acid; and sulfonic acid such as methanesulfonic acid, ethanesulfonic acid, propanesulfonic acid, butanesulfonic acid, pentanesulfonic acid, octanesulfonic acid, benzenesulfonic acid, p-toluenesulfonic acid, camphorsulfonic acid, trifluoromethanesulfonic acid, p-phenolsulfonic acid, 2-naphthalenesulfonic acid, mesitylenesulfonic acid, p-xylene-2-sulfonic acid, m-xylene-2-sulfonic acid, 4-ethylbenzenesulfonic acid, 1H,1H,2H,2H-perfluorooctanesulfonic acid, perfluoro(2-ethoxyethane)sulfonic acid, pentafluoroethanesulfonic acid, nonafluorobutane-1-sulfonic acid, and dodecylbenzenesulfonic acid, and a hydrate or a salt thereof. Examples of the compound generating an acid by being heated include bis(tosyloxy)ethane, bis(tosyloxy)propane, bis(tosyloxy)butane, p-nitrobenzyl tosylate, o-nitrobenzyl tosylate, 1,2,3-phenylene tris(methylsulfonate), p-toluenesulfonic acid pyridinium salt, p-toluenesulfonic acid morpholinium salt, p-toluenesulfonic acid ethyl ester, p-toluenesulfonic acid propyl ester, p-toluenesulfonic acid butyl ester, p-toluenesulfonic acid isobutyl ester, p-toluenesulfonic acid methyl ester, p-toluenesulfonic acid phenethyl ester, cyanomethyl p-toluenesulfonate, 2,2,2-trifluoroethyl p-toluenesulfonate, 2-hydroxybutyl p-toluenesulfonate, N-ethyl-p-toluenesulfonamide,
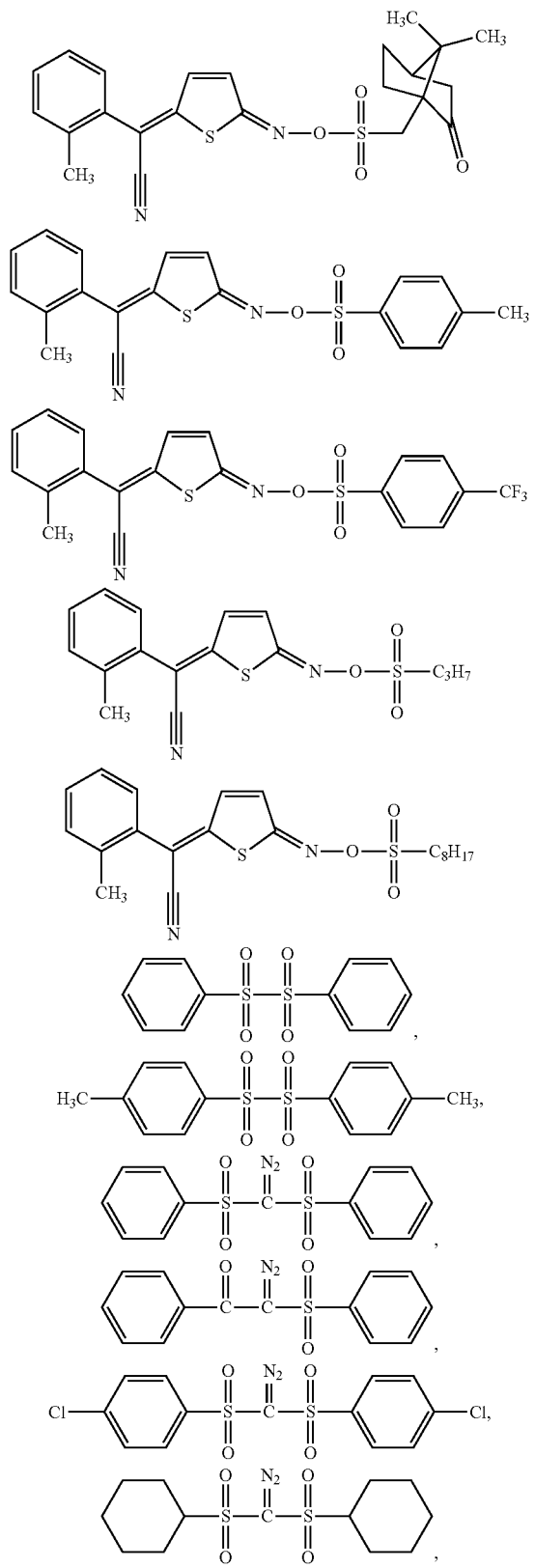
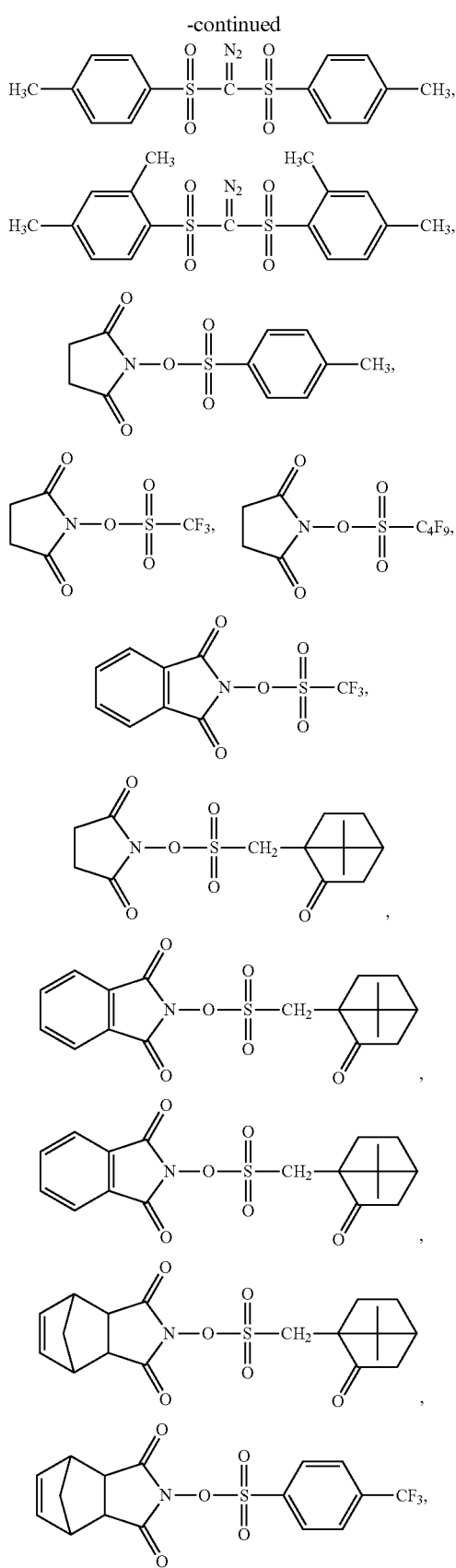

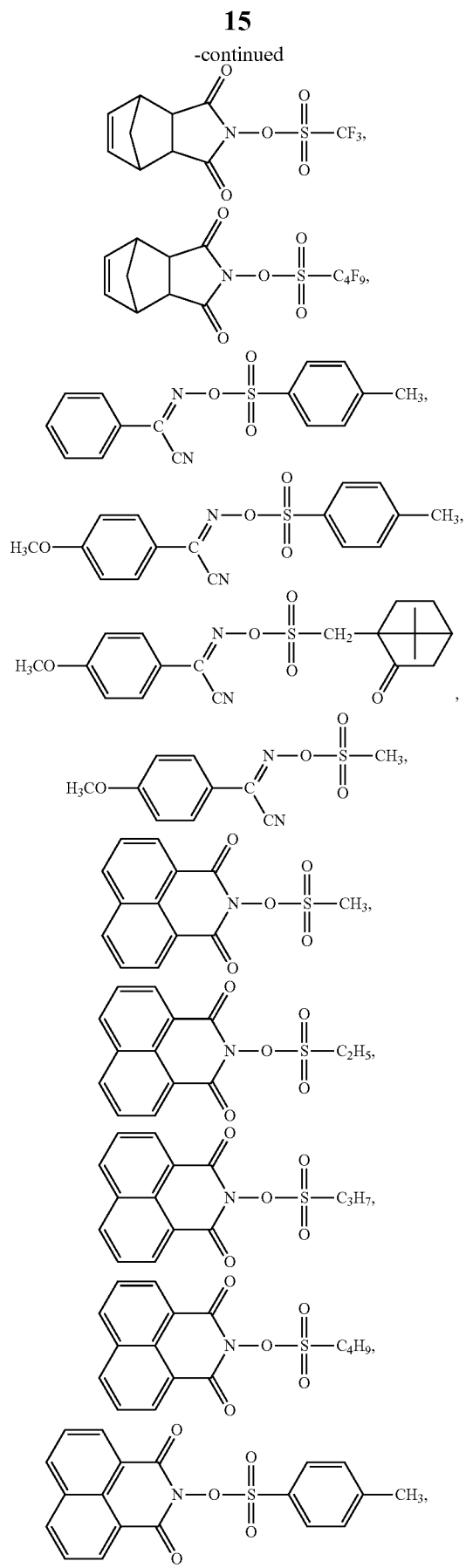

The content of the component (D) in the composition for forming thermoset film having photo-alignment properties of the present invention is preferably 0.01 to 10 parts by mass, more preferably 0.1 to 6 parts by mass, further preferably 0.5 to parts by mass, relative to 100 parts by mass of the total amount of the compound as the component (A) and the polymer as the component (B). By blending the component (D) in a content of 0.01 parts by mass or more in the composition, satisfactory thermo-curability and satisfactory solvent resistance can be imparted to the composition and furthermore, high sensitivity relative to light irradiation can also be imparted to the composition. However, when the content of the component (D) is more than 10 parts by mass, the preservation stability of the composition may be lowered.

<Component (E)>

In the present invention, the composition may contain a sensitizer as the component (E). The component (E) is effective for accelerating the photodimerization reaction after the formation of the thermoset film of the present invention.

Examples of the sensitizer as the component (E) include benzophenone, anthracene, anthraquinone, thioxanthone, derivatives thereof, and a nitrophenyl compound. Among them, a benzophenone derivative and a nitrophenyl compound are preferred. Specific examples of the preferred compound include N,N-diethylaminobenzophenone, 2-nitrofluorene, 2-nitrofluorenone, 5-nitroacenaphthene, 4-nitrobiphenyl, 4-nitrocinnamic acid, 4-nitrostilbene, 4-nitrobenzophenone, and 5-nitroindole. Particularly, N,N-diethylaminobenzophenone, which is a derivative of benzophenone, is preferred.

Examples of the sensitizer are not limited to the above-described examples. The sensitizers may be used individually or in combination of two or more types thereof.

The content of the sensitizer as the component (E) in the present invention is preferably 0.1 to 20 parts by mass, more preferably 0.2 to 10 parts by mass, relative to 100 parts by mass of the total mass of the compound as the component (A) and the polymer as the component (B). When the content is excessively small, the effect as the sensitizer cannot be satisfactorily obtained. When the content is excessively large, lowering of the transmittance and roughness of the coating film may be caused.

<Solvent>

The composition for forming thermoset film having photo-alignment properties of the present invention is mainly used in a solution state in which the composition is dissolved in a solvent. The type and the structure of the solvent used at this time are not particularly limited so long as the solvent can dissolve the component (A), the component (B), and the component (C) and if necessary, the component (D), the component (E) and/or other additives described below.

Specific examples of the solvent include ethylene glycol monomethyl ether, ethylene glycol monoethyl ether, methylcellosolve acetate, ethylcellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, toluene, xylene, methyl ethyl ketone, cyclopentanone, cyclohexanone, 2-butanone, 3-methyl-2-pentanone, 2-pentanone, 2-heptanone, γ-butyrolactone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropinoate, ethyl 3-methoxypropionate, ethyl 3-ethoxypropionate, methyl 3-ethoxypropionate, methyl pyruvate, ethyl pyruvate, ethyl acetate, butyl acetate, ethyl lactate, butyl lactate, N,N-dimethylformamide, N,N-dimethylacetamide, and N-methylpyrrolidone.

When a TAC film is used, methanol, ethanol, isopropanol, 1-propanol, butanol, 2-methyl-1-butanol, 2-heptanone, methyl isobutyl ketone, propylene glycol monomethyl ether, propylene glycol, diethylene glycol, and propylene glycol monomethyl ether acetate are preferred because a TAC film exhibits resistance against these solvents.

These solvents may be used individually or in combination of two or more types thereof. Among these solvents, propylene glycol monomethyl ether, propylene glycol monomethyl ether acetate, cyclohexanone, 2-heptanone, propylene glycol propyl ether, propylene glycol propyl ether acetate, ethyl lactate, butyl lactate, methyl 3-methoxypropionate, ethyl 3-methoxypropionate, ethyl 3-ethoxypropionate, and methyl 3-ethoxypropionate can be applied to the production line of an overcoating of a color filter and have advantageous film-formation property and high safety, so that they are more preferred.

<Other Additives>

Furthermore, the composition for forming thermoset film having photo-alignment properties of the present invention may contain, so long as not impairing the effect of the present invention and if necessary, a silane coupling agent, a surfactant, a rheology adjusting agent, a pigment, a dye, a preservation stabilizer, an antifoamer, an antioxidant, and the like.

<Composition for Forming Thermoset Film Having Photo-Alignment Properties>

The composition for forming thermoset film having photo-alignment properties of the present invention is a composition containing the compound as the component (A), the polymer as the component (B), and the crosslinker as the component (C) and capable of further containing, if desired, one or more type(s) of the acid or the thermo-acid generator as the component (D), the sensitizer as the component (E), and other additives. These components are normally dissolved in a solvent to be used as a solution.

The blending ratio between the component (A) and the component (B) is preferably 5:95 to 60:40 in a mass ratio. When the content of the component (B) is excessive compared with this range of blending ratio, the liquid crystal alignment properties of the composition are prone to be lowered. When the content of the component (B) is lower than this range of blending ratio, the solvent resistance of the composition decreases and consequently, the alignment properties of the composition are prone to be lowered.

Preferred examples of the composition for forming thermoset film having photo-alignment properties of the present invention are as follows.

[1]: The composition for forming thermoset film having photo-alignment properties, in which the blending ratio between the component (A) and the component (B) is 5:95 to 60:40 in a mass ratio, and the component (C) is contained in a content of 10 to 100 parts by mass, based on 100 parts by mass of the total amount of the component (A) and the component (B).

[2]: The composition for forming thermoset film having photo-alignment properties, in which the component (C) in a content of 10 to 100 parts by mass, based on 100 parts by mass of the total amount of the component (A) and the component (B), and a solvent are contained.

[3]: The composition for forming thermoset film having photo-alignment properties, in which the component (C) in a content of 10 to 100 parts by mass, the component (D) in a content of 0.01 to 5 parts by mass, based on 100 parts by mass of the total amount of the component (A) and the component (B), and a solvent are contained.

[4]: The composition for forming thermoset film having photo-alignment properties, in which the component (C) in a content of 10 to 100 parts by mass, the component (D) in a content of 0.01 to 5 parts by mass, the component (E) in a content of 0.1 to 20 parts by mass, based on 100 parts by mass of the total amount of the component (A) and the component (B), and a solvent are contained.

The blending ratio, the preparing method, and the like when the composition for forming thermoset film having photo-alignment properties of the present invention is used as a solution, are described in detail below.

Although the solid content in the composition for forming thermoset film having photo-alignment properties of the present invention is not particularly limited so long as each component of the composition is homogeneously dissolved in a solvent, the content is 1 to 80% by mass, preferably 3 to 60% by mass, more preferably 5 to 40% by mass. Here, the solid content refers to a component remaining after subtracting the solvent from the whole component of the composition for forming thermoset film having photo-alignment properties.

The preparing method of the composition for forming thermoset film having photo-alignment properties of the present invention is not particularly limited. Examples of the preparing method include: a method including mixing, at predetermined mixing ratios, the component (A) and the component (C), and further the component (D) and the component (E) in a solution in which the component (B) is dissolved, to prepare a homogeneous solution; and a method including this preparing method and further adding, in an appropriate stage as necessary, other additives to be mixed in the resultant mixture.

In the preparation of the composition for forming thermoset film having photo-alignment properties of the present invention, the solution of the specific polymer obtained by a polymerization reaction in a solvent can be used as it is. In this case, for example, into the solution of the component (B) obtained by copolymerizing at least one of a monomer having a $C_{2-5}$ alkyl ester group and a monomer having a $C_{1-4}$ hydroxyalkyl ester group with at least one of a monomer having a carboxy group and a monomer having a phenolic hydroxy group, the component (A), the component (C), the component (D), the component (E), and the like are charged in the same manner as described above to prepare a homogeneous solution. At this time, for the purpose of adjusting the concentration, further the solvent may be additionally charged. At this time, the solvent used in the production process of the component (B) and the solvent used for adjusting the concentration of the composition for forming thermoset film having photo-alignment properties may be the same as or different from each other.

The prepared solution of the composition for forming thermoset film having photo-alignment properties is preferably filtered using a filter having a pore diameter of around 0.2 μm to be used.

<Coating Film, Cured Film, and Liquid Crystal Alignment Layer>

By a method including: applying the solution of the composition for forming thermoset film having photo-alignment properties, which is one embodiment of the present invention, onto a substrate (for example, a silicon/silicon dioxide coated substrate, a silicon nitride substrate, a substrate coated with a metal such as aluminum, molybdenum, and chromium, a glass substrate, a quartz substrate, an ITO substrate, and the like), a film (for example, a resin film such as a triacetylcellulose film, a polyester film, and an acrylic film), or the like by rotation coating, flow coating, roll coating, slit coating, slit coating followed by rotation coating, inkjet coating, printing, or the like; and then, predrying (prebaking) the resultant coating on a hot plate or in an oven, a coating film can be formed. Then, by subjecting the coating film to a heating treatment (postbaking), a cured film is formed.

As the conditions for prebaking, a heating temperature and a heating time accordingly selected from the range of the temperature 70° C. to 140° C. and the time 0.4 to 60 minutes are adopted. The heating temperature and the heating time are preferably 80° C. to 130° C. and 0.5 to 10 minutes, respectively.

As the postbaking, there is adopted, for example, a method in which the coating film is subjected to a heating treatment at a heating temperature selected from a range of the temperature 100° C. to 250° C. for 1 to 30 minute(s) in the case of on a hot plate, for 5 to 90 minutes in the case of in an oven.

The film thickness of the cured film formed using the composition for forming thermoset film having photo-alignment properties of the present invention is, for example, 0.06 to 30 μm and can be accordingly selected by considering the level difference and the optical and electrical properties of the used substrate.

By curing the composition for forming thermoset film having photo-alignment properties of the present invention under the above-mentioned conditions, the level difference of the substrate can be satisfactorily covered and a cured film having high transparency can be formed.

By irradiating the thus formed thermoset film having photo-alignment properties with polarized UV, the thermoset film can be caused to function as a liquid crystal material alignment layer, that is, a layer in which a compound having liquid crystallinity is aligned.

In the irradiating method of polarized UV, usually, ultraviolet light to visible light having a wavelength of 150 to 450 nm are used and the irradiation is performed by irradiating the thermoset film at room temperature or in a heated state with linear polarized light in a vertical direction or an oblique direction.

The liquid crystal alignment layer formed from the composition for forming thermoset film having photo-alignment properties of the present invention has solvent resistance and heat resistance, so that by applying a retardation material onto the liquid crystal alignment layer and heating the resultant coating to a phase transition temperature of the liquid crystal, the retardation material is converted into a liquid crystal state, and by photo-curing this retardation material, a layer having optical anisotropy can be formed.

As the retardation material, for example, a liquid crystal monomer having a polymerizable group and a composition containing the same are used. Then, when the base material forming the liquid crystal alignment layer is a film, the film is useful as an optically anisotropic film. Some of such retardation materials have alignment properties such as horizontal alignment, cholesteric alignment, vertical alignment, and hybrid alignment and such retardation materials can be used properly according to the necessary retardation.

By laminating two substrates having the liquid crystal alignment layer formed as described above via a spacer so that the liquid crystal alignment layers face each other via a spacer and by injecting a liquid crystal between the two substrates, a liquid crystal display element in which a liquid crystal is aligned can be prepared.

Therefore, the composition for forming thermoset film having photo-alignment properties of the present invention can be suitably used in various optically anisotropic films and various liquid crystal display elements.

The composition for forming thermoset film having photo-alignment properties of the present invention is useful also as a material for forming a cured film such as a protective film and an insulation film in various displays such as a thin film transistor (TFT) liquid crystal display element and an organic EL element, and is particularly suitable also as a material for forming an overcoating material of a color filter, an interlayer insulation film of a TFT liquid crystal element, an insulation film of an organic EL element, and the like.

EXAMPLES

The present invention will be described further in detail hereinafter referring to Examples, which should not be construed as limiting the scope of the present invention.

[Abbreviations Used in Examples]

The meanings of the abbreviations used in Examples below are as follows.

<Compound Having Photo-Aligning Group and Hydroxy Group>
CIN 1: 4-(6-hydroxyhexyloxy)cinnamic acid methyl ester
CIN 2: cinnamic acid 6-hydroxyhexyl ester
CIN 3: 4-hydroxycinnamic acid methyl ester
AZB 1: 4-(6-hydroxyhexyloxy)azobenzene
CIN 5: 4-(6-hydroxyhexyloxy)-3-methoxycinnamic acid methyl ester
CD: methylated γ-cyclodextrin (methyl substitution rate: 1.8) (25% PM solution)
PN: phenol novolac resin (manufactured by Gunei Chemical Industry Co., Ltd.; trade name: RESITOP PSM-4324) (25% PM solution)
PM: propylene glycol monomethyl ether
<Specific Polymer Raw Material>
HEMA: 2-hydroxyethyl methacrylate
MMA: methyl methacrylate
MAA: methacrylic acid
CHMI: N-cyclohexylmaleimide
CIN4: 4-(6-methacryloxyhexyloxy)cinnamic acid methyl ester
AIBN: α,α'-azobisisobutyronitrile
HBPDA: bis(3,4-dicarboxycyclohexyl)dianhydride
HBPA: 2,2-bis(4-hydroxycyclohexyl) propane
BTEAC: benzyltriethylammonium chloride
<Crosslinker>
HMM: hexamethoxymethylmelamine
TMGU: 1,3,4,6-tetrakis(methoxymethyl)glycoluril
<Acid or Thermo-Acid Generator>
PTSA: p-toluenesulfonic acid monohydrate
<Sensitizer>
DEAB: N,N'-diethylaminobenzophenone
<Solvent>
CHN: cyclohexanone
PM: propylene glycol monomethyl ether
PMA: propylene glycol monomethyl ether acetate The number average molecular weight and the weight average molecular weight of the acrylic copolymer obtained according to Synthetic Examples below were measured using a GPC apparatus (manufactured by JASCO Corporation; Shodex (registered trademark) column KF 803L and KF 804L) under the condition of performing elution by flowing an elution solvent tetrahydrofuran in the column (column temperature: 40° C.) at a flow rate of 1 mL/min. The number average molecular weight (hereinafter, called Mn) and the weight average molecular weight (hereinafter, called Mw) were expressed as a value in terms of polystyrene.

Synthetic Example 1

48.0 g of CIN 4, 12.0 g of MMA, and 1.3 g of AIBN as a polymerization catalyst were dissolved in 166.8 g of CHN and the resultant reaction solution was subjected to the reaction at 80° C. for 20 hours to obtain an acrylic copolymer solution (solid content concentration: 27% by mass) (P1). Mn and Mw of the obtained acrylic copolymer were 8,700 and 18,000, respectively.

Synthetic Example 2

2.5 g of MAA, 9.2 g of MMA, 5.0 g of HEMA, and 0.2 g of AIBN as a polymerization catalyst were dissolved in 50.7 g of PM and the resultant reaction solution was subjected to the reaction at 70° C. for 20 hours to obtain an acrylic copolymer solution (solid content concentration: 25% by mass) (P2). Mn and Mw of the obtained acrylic copolymer were 19,600 and 45,200, respectively.

Synthetic Example 3

3.5 g of MAA, 7.0 g of MMA, 7.0 g of HEMA, and 0.5 g of AIBN as a polymerization catalyst were dissolved in 53.9 g of PM and the resultant reaction solution was subjected to the reaction at 75° C. for 20 hours to obtain an acrylic copolymer solution (solid content concentration: 25% by mass) (P3). Mn and Mw of the obtained acrylic copolymer were 10,300 and 24,600, respectively.

Synthetic Example 4

10.5 g of MAA, 7.0 g of CHMI, and 0.5 g of AIBN as a polymerization catalyst were dissolved in 53.9 g of PM and the resultant reaction solution was subjected to the reaction at 75° C. for 20 hours to obtain an acrylic copolymer solution (solid content concentration: 25% by mass) (P4). Mn and Mw of the obtained acrylic copolymer were 13,500 and 28,400, respectively.

Synthetic Example 5

12.0 g of HBPDA, 10.2 g of HBPA, and 0.22 g of BTEAC were dissolved in 54.48 g of PMA and the resultant reaction solution was subjected to the reaction at 125° C. for 19 hours to obtain a polyester solution (solid content concentration: 30.0% by mass) (P5). Mn and Mw of the obtained polyester were 1,980 and 3,500, respectively.

Examples 1 to 10 and Comparative Examples 1 to 4

Each of the compositions of Examples 1 to 10 and Comparative Examples 1 to 4 was prepared according to the formulation shown in Table 1 and each composition was subjected to the evaluations of solvent resistance, alignment properties, and transmittance.

In addition, each of the compositions of Examples 7 to 10 and Comparative Examples 1 and 2 was subjected to the evaluations of resolution and patterning on TAC.

TABLE 1

| | Component (A) (g) | Solution of component (B) (g) | Component (C) (g) | Component (D) (g) | Solvent (g) |
|---|---|---|---|---|---|
| Example 1 | CIN 1 0.99 | P2 5.96 | HMM 0.99 | PTSA 0.022 | CHN/PM 11.9/0.63 |
| Example 2 | CIN 2 0.99 | P2 5.96 | HMM 0.99 | PTSA 0.022 | CHN/PM 11.9/0.63 |
| Example 3 | CIN 3 0.99 | P2 5.96 | HMM 0.99 | PTSA 0.022 | CHN/PM 11.9/0.63 |
| Example 4 | AZB 1 0.99 | P2 5.96 | HMM 0.99 | PTSA 0.022 | CHN/PM 11.9/0.63 |
| Example 5 | CIN 1 0.99 | P3 5.96 | HMM 0.99 | PTSA 0.022 | CHN/PM 11.9/0.63 |
| Example 6 | CIN 1 0.99 | P2 5.96 | TMGU 0.32 | PTSA 0.022 | CHN/PM 11.9/0.63 |
| Example 7 | CIN 5 0.99 | P2 5.96 | HMM 1.24 | PTSA 0.099 | PM 57.01 |
| Example 8 | CIN 1 0.99 | CD 5.96 | HMM 1.24 | PTSA 0.099 | PM 57.01 |
| Example 9 | CIN 1 0.99 | PN 5.96 | HMM 1.24 | PTSA 0.099 | PM 57.01 |

TABLE 1-continued

| | Component (A) (g) | Solution of component (B) (g) | Component (C) (g) | Component (D) (g) | Solvent (g) |
|---|---|---|---|---|---|
| Example 10 | CIN 1 0.99 | P5 4.96 | HMM 1.24 | PTSA 0.099 | PM 58.01 |
| Comparative Example 1 | CIN 4 0.99 | P2 5.96 | HMM 0.99 | PTSA 0.022 | CHN/PM 11.9/0.63 |
| Comparative Example 2 | | P1 10 | — | — | CHN 8 |
| Comparative Example 3 | CIN 1 0.75 | P1 9 | — | — | CHN 10.2 |
| Comparative Example 4 | CIN 1 0.99 | P4 5.96 | HMM 0.99 | PTSA 0.022 | CHN/PM 11.9/0.63 |

[Evaluation of Solvent Resistance]

Each of the compositions of Example 1 to Example 6 and Comparative Example 1 to Comparative Example 4 was applied onto a silicon wafer using a spin coater and the resultant coating was prebaked on a hot plate at a temperature of 80° C. for 120 seconds to form a coating film having a film thickness of 1.1 μm. The film thickness was measured using F20 (manufactured by Filmetries, Inc.). This coating film was postbaked on a hot plate at a temperature of 130° C. for 5 minutes to form a cured film having a film thickness of 1.0 μm.

This cured film was immersed in CHN or NMP for 60 seconds and was dried at a temperature of 100° C. for 60 seconds to measure the film thickness. A cured film that caused no change in the film thickness after the immersion in CHN or NMP was evaluated as "○" and a cured film in which a decrease of the film thickness after the immersion was observed was evaluated as "x".

[Evaluation of Alignment Sensitivity (Alignment Properties)]

Each of the compositions of Example 1 to Example 6 and Comparative Example 1 to Comparative Example 4 was applied onto an ITO substrate using a spin coater and the resultant coating was prebaked on a hot plate at a temperature of 80° C. for 120 seconds to form a coating film having a film thickness of 1.1 μm. The film thickness was measured using F20 (manufactured by Filmetrics, Inc.). This coating film was postbaked on a hot plate at a temperature of 130° C. for 5 minutes to form a cured film.

This cured film was irradiated perpendicularly with linear polarized light of 300 to 400 nm. Onto the substrate, a retardation material solution containing a liquid crystal monomer was applied using a spin coater and the resultant coating was prebaked on a hot plate at 80° C. for 60 seconds to form a coating film having a film thickness of 0.25 μm. The substrate was exposed to light with 1,000 mJ/cm$^2$ in a nitrogen atmosphere. The prepared substrate was sandwiched between deflection plates and the exposure dosage of polarized UV at 313 nm required for exhibiting alignment properties was measured as an alignment sensitivity. A cured film causing no alignment by being irradiated with 1,000 mJ/cm$^2$ or more was evaluated as "not aligned".

[Evaluation of Light Transmittance (Transparency)]

Each of the compositions of Example 1 to Example 6 and Comparative Example 1 to Comparative Example 4 was applied onto a quartz substrate using a spin coater and the resultant coating was prebaked on a hot plate at a temperature of 80° C. for 120 seconds to form a coating film having a film thickness of 1.0 μm. The film thickness was measured using F20 (manufactured by Filmetrics, Inc.). This coating film was postbaked in a hot wind circulating-type oven at a temperature of 130° C. for 5 minutes to form a cured film.

The transmittance of this cured film relative to light having a wavelength of 400 nm was measured using a ultraviolet visible light spectrophotometer (manufactured by Shimadzu Corporation; trade name: Shimadzu UV-2550).

[Results of Evaluation]

The results of the evaluations are shown in Table 2 below.

TABLE 2

| | Solvent resistance | | Alignment sensitivity | Transmittance |
|---|---|---|---|---|
| | CHN | NMP | (mJ/cm$^2$) | (%) |
| Example 1 | ○ | ○ | 50 | 99 |
| Example 2 | ○ | ○ | 200 | 99 |
| Example 3 | ○ | ○ | 300 | 92 |
| Example 4 | ○ | ○ | 300 | 85 |
| Example 5 | ○ | ○ | 50 | 99 |
| Example 6 | ○ | ○ | 100 | 99 |
| Comparative Example 1 | X | X | Not aligned | 93 |
| Comparative Example 2 | X | X | 1,000 | 93 |
| Comparative Example 3 | X | X | Not aligned | 92 |
| Comparative Example 4 | X | X | Not aligned | 93 |

Examples 1 to 6 had high heat resistance, high transparency, and exhibited resistance against any of CHN and NMP. Each of them exhibited alignment properties with a small exposure dosage.

In Comparative Examples 1 to 4, satisfactory solvent resistance could not be obtained and alignment sensitivity also lowered largely.

[Evaluation of Solvent Resistance]

Each of the compositions of Example 7 to Example 10 and Comparative Example 1 and Comparative Example 2 was applied onto a silicon wafer using a spin coater and the resultant coating was baked on a hot plate at a temperature of 130° C. for 60 seconds to form a cured film having a film thickness of 0.2 μm. The film thickness was measured using F20 (manufactured by Filmetrics, Inc.).

This cured film was immersed in CHN or NMP for 60 seconds and was dried at a temperature of 100° C. for 60 seconds to measure the film thickness. A cured film that caused no change in the film thickness after the immersion in CHN or NMP was evaluated as "○" and a cured film in which a decrease of the film thickness after the immersion was observed was evaluated as "x".

[Evaluation of Alignment Sensitivity (Alignment Properties)]

Each of the compositions of Example 7 to Example 10 and Comparative Example 1 and Comparative Example 2 was applied onto an ITO substrate using a spin coater and the resultant coating was baked on a hot plate at a temperature of 130° C. for 60 seconds to form a cured film having a film thickness of 0.2 μm. The film thickness was measured using F20 (manufactured by Filmetrics, Inc.).

This cured film was irradiated perpendicularly with linearly polarized light of 300 nm to 400 nm. Onto the substrate, a retardation material solution containing a liquid crystal monomer was applied using a spin coater and the resultant coating was baked on a hot plate at 80° C. for 60 seconds to form a coating film having a film thickness of 1.0 μm. The substrate was exposed to light with 1,000 mJ/cm$^2$ in a nitrogen atmosphere. The prepared substrate was sandwiched between deflection plates and the exposure dose of polarized UV at 313 nm required for exhibiting alignment properties was measured as the alignment sensitivity. A cured film causing no alignment by being irradiated with 1,000 mJ/cm² or more was evaluated as "not aligned".

[Evaluation of Light Transmittance (Transparency)]

Each of the compositions of Example 7 to Example 10 and Comparative Example 1 and Comparative Example 2 was applied onto a quartz substrate using a spin coater and the resultant coating was baked on a hot plate at a temperature of 130° C. for 60 seconds to form a cured film having a film thickness of 0.2 μm. The film thickness was measured using F20 (manufactured by Filmetrics, Inc.).

The transmittance of this cured film relative to light having a wavelength of 400 nm was measured using a ultraviolet visible light spectrophotometer (manufactured by Shimadzu Corporation; trade name: Shimadzu UV-2550).

[Evaluation of Resolution]

Each of the compositions of Example 7 to Example 10 and Comparative Example 1 and Comparative Example 2 was applied onto a glass substrate using a spin coater and the resultant coating was baked on a hot plate at a temperature of 130° C. for 60 seconds to form a cured film having a film thickness of 0.2 μm. The film thickness was measured using F20 (manufactured by Filmetrics, Inc.).

This cured film was irradiated perpendicularly with linearly polarized light of 300 nm to 400 nm in a direction of +45° through a photomask containing a line-and-space pattern of 10 μm, 15 μm, 30 μm, 100 μm, or 300 μm. Next, the photomask was removed and the cured film was irradiated perpendicularly with linearly polarized light of 300 to 400 nm in a direction of −45°. The irradiation dose was, at the first exposure, twice the alignment sensitivity and at the second exposure, the same exposure dose as the alignment sensitivity. Onto the substrate, a retardation material solution containing a liquid crystal monomer was applied using a spin coater and the resultant coating was baked on a hot plate at 80° C. for 60 seconds to form a coating film having a film thickness of 1.0 μm. The substrate was exposed to light with 1,000 mJ/cm² in a nitrogen atmosphere. The prepared substrate was sandwiched between deflection plates orthogonal to each other and the minimum line width by which all lines were aligned without failure was measured as the resolution.

[Evaluation of Patterning on TAC]

Each of the compositions of Example 7 to Example 10 and Comparative Example 1 and Comparative Example 2 was applied onto a TAC film using a spin coater and the resultant coating was baked on a hot plate at a temperature of 130° C. for 60 seconds to form a cured film having a film thickness of 0.2 μm. The film thickness was measured using F20 (manufactured by Filmetrics, Inc.).

This cured film was irradiated perpendicularly with linearly polarized light of 300 nm to 400 nm in a direction of +45° through a photomask containing a line-and-space pattern of 100 μm. Next, the photomask was removed and the cured film was irradiated perpendicularly with linearly polarized light of 300 nm to 400 nm in a direction of −45°. The irradiation dose was, at the first exposure, twice the alignment sensitivity and at the second exposure, the same exposure dose as the alignment sensitivity. Onto the substrate, a retardation material solution containing a liquid crystal monomer was applied using a spin coater and the resultant coating was baked on a hot plate at 80° C. for 60 seconds to form a coating film having a film thickness of 1.0 μm. The substrate was exposed to light with 1,000 mJ/cm² in a nitrogen atmosphere. The prepared substrate was sandwiched between deflection plates orthogonal to each other and a pattern in which all lines were aligned without failure was evaluated as "○" and a pattern in which an alignment failure was observed was evaluated as "x".

[Results of Evaluation]

The results of the evaluations are shown in Table 3 below.

TABLE 3

| | Solvent resistance | | Alignment sensitivity | Transmittance | Resolution | Patterning on TAC |
|---|---|---|---|---|---|---|
| | CHN | NMP | (mJ/cm²) | (%) | (μm) | |
| Example 7 | ○ | ○ | 10 | 100 | 15 | ○ |
| Example 8 | ○ | ○ | 50 | 100 | 30 | ○ |
| Example 9 | ○ | ○ | 50 | 95 | 30 | ○ |
| Example 10 | ○ | ○ | 50 | 100 | 30 | ○ |
| Comparative Example 1 | x | x | Not aligned | 99 | — | x |
| Comparative Example 2 | x | x | 1,000 mJ | 99 | — | x |

Examples 7 to 10 had high transparency and exhibited resistance against any solvent of CHN and NMP. Each of the compositions exhibited alignment properties with a small exposure dose and optical patterning could be performed with a high resolution. Furthermore, even on a TAC film, a pattern could be formed.

Comparative Examples 1 and 2 failed to provide satisfactory solvent resistance and alignment sensitivity was lowered largely.

INDUSTRIAL APPLICABILITY

The composition for forming thermoset film having photo-alignment properties according to the present invention is extremely useful as a material for a liquid crystal alignment layer of an optically anisotropic film or a liquid crystal display element and furthermore, is also suitable as a material for forming a cured film such as a protective film and an insulation film in various displays such as a thin film transistor (TFT) liquid crystal display element and an organic EL element, particularly as a material for forming a retardation film, a patterned retardation plate for a 3D display, an interlayer insulation film of a TFT liquid crystal element, an overcoating of a color filter, an insulation film of an organic EL element, and the like.

The invention claimed is:

1. A composition for forming thermoset film having photo-alignment properties, comprising:
a component (A) that is a compound consisting of at least one of the following formulae:

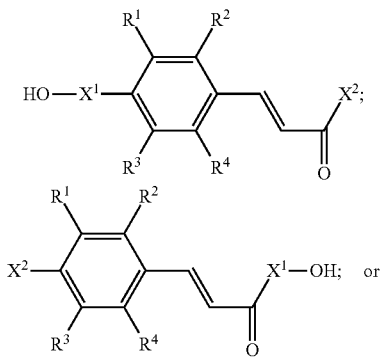

-continued

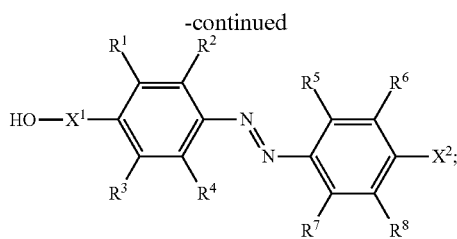

a component (B) that is a polymer having any one of or both of a hydroxy group and a carboxy group, and is selected from the group consisting of an acrylic polymer having at least one of a $C_{2-5}$ alkyl ester group and a $C_{2-5}$ hydroxyalkyl ester group and at least one of a carboxy group and a phenolic hydroxy group, a phenol novolac resin, cyclodextrin or a derivative thereof, and a polyester resin having a carboxy group; and a component (C) that is a crosslinker, wherein $X^1$ is a single bond or is a $C_{1-18}$ alkylene group, a phenylene group, a biphenylene group, or a cyclohexylene group bonded through a covalent bond, an ether bond, an ester bond, an amide bond, an amino bond, or a urea bond, $X^2$ is a hydrogen atom, a cyano group, a nitro group, a $C_{1-18}$ alkyl group, a phenyl group, a biphenyl group, or a cyclohexyl group bonded through a covalent bond, an ether bond, an ester bond, an amide bond, an amino bond, or a urea bond, $R^1$, $R^2$, $R^3$, $R^4$, $R^5$, $R^6$, $R^7$, and $R^8$ are independently a hydrogen atom, a $C_{1-4}$ alkyl group, a $C_{1-4}$ alkoxy group, a halogen atom, a trifluoromethyl group, or a cyano group, and wherein the composition is curable by heating to form said thermoset film having photo-alignment properties.

2. The composition for forming thermoset film having photo-alignment properties according to claim 1, wherein the component (B) is an acrylic polymer having at least one of a $C_{2-5}$ alkyl ester group and a $C_{2-5}$ hydroxyalkyl ester group and at least one of a carboxy group and a phenolic hydroxy group.

3. The composition for forming thermoset film having photo-alignment properties according to claim 1, wherein the component (B) is an acrylic copolymer obtained by a polymerization reaction of monomers containing at least one of a monomer having a $C_{2-5}$ alkyl ester group and a monomer having a $C_{2-5}$ hydroxyalkyl ester group and at least one of a monomer having a carboxy group and a monomer having a phenolic hydroxy group.

4. The composition for forming then loset film having photo-alignment properties according to claim 1, wherein the component (B) is a phenol novolac resin.

5. The composition for forming thermoset film having photo-alignment properties according to claim 1, wherein the component (B) is cyclodextrin or a derivative thereof.

6. The composition for forming thermoset film having photo-alignment properties according to claim 1, wherein the component (B) is a polyester resin having a carboxy group.

7. The composition for forming thermoset film having photo-alignment properties according to claim 1, wherein the crosslinker as the component (C) is a crosslinker having a methylol group or an alkoxymethylol group.

8. The composition for forming thermoset film having photo-alignment properties according to claim 1, further comprising:

as a component (D), an acid or a thermo-acid generator.

9. The composition for forming thermoset film having photo-alignment properties according to claim 1, further comprising:

as a component (E), a sensitizer.

10. The composition for forming thermoset film having photo-alignment properties according to claim 1, wherein the ratio between the component (A) and the component (B) is 5:95 to 60:40 in a mass ratio.

11. The composition for forming thermoset film having photo-alignment properties according to claim 1, wherein 10 to 100 parts by mass of the component (C), based on 100 parts by mass of the total amount of the component (A) and the component (B), is contained.

12. The composition for forming thermoset film having photo-alignment properties according to claim 8, wherein 0.01 to 10 parts by mass of the component (D), based on 100 parts by mass of the total amount of the component (A) and the component (B), is contained.

13. The composition for forming thermoset film having photo-alignment properties according to claim 9, wherein 0.1 to 20 parts by mass of the component (E), based on 100 parts by mass of the total amount of the component (A) and the component (B), is contained.

14. The composition for forming thermoset film having photo-alignment properties according to claim 1, wherein:

a glycol-based solvent or a glycol ester-based solvent as a solvent for dissolving the component (A), the component (B), and the component (C).

15. A liquid crystal alignment layer formed from the composition for forming thermoset film having photo-alignment properties as claimed in claim 1.

16. An optical device including a retardation layer obtained using the composition for forming thermoset film having photo-alignment properties as claimed in claim 1.

17. A patterned retardation plate formed from the composition for forming thermoset film having photo-alignment properties as claimed in claim 1.

18. The composition for forming thermoset film having photo-alignment properties according to claim 1, wherein the compound of the component (A) is

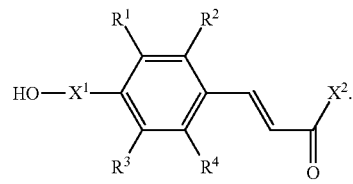

19. The composition for forming thermoset film having photo-alignment properties according to claim 1, wherein the compound of the component (A) is

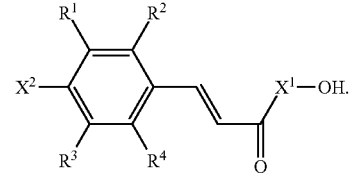

20. The composition for forming thermoset film having photo-alignment properties according to claim 1, wherein the compound of the component (A) is

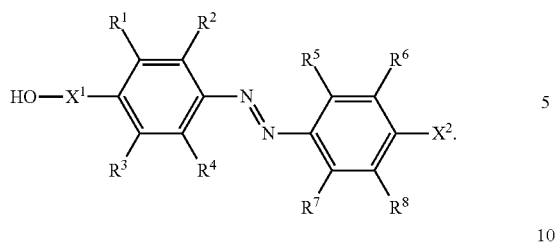

21. The composition for forming thermoset film having photo-alignment properties according to claim 1, wherein the ratio between the component (A) and the component (B) is 5:95 to 60:40 in a mass ratio, and 10 to 100 parts by mass of the component (C), based on 100 parts by mass of the total amount of the component (A) and the component (B), is contained.

22. The composition for forming thermoset film having photo-alignment properties according to claim 1, wherein the component (C) crosslinks the component (A) and the component (B).

23. The composition for forming thermoset film having photo-alignment properties according to claim 1, wherein the component (C) bonds with a hydroxy group of the compound as the component (A) and a hydroxy group and/or carboxy group moiety contained in the component (B).

* * * * *